US009415740B2

(12) United States Patent
Motomochi et al.

(10) Patent No.: US 9,415,740 B2
(45) Date of Patent: Aug. 16, 2016

(54) AIRBAG APPARATUS

(71) Applicants: Akihiro Motomochi, Tokyo (JP); Kei Tsujimoto, Tokyo (JP)

(72) Inventors: Akihiro Motomochi, Tokyo (JP); Kei Tsujimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 42 days.

(21) Appl. No.: 14/566,776

(22) Filed: Dec. 11, 2014

(65) Prior Publication Data

US 2015/0175119 A1 Jun. 25, 2015

(30) Foreign Application Priority Data

Dec. 19, 2013 (JP) .................................. 2013-262849

(51) Int. Cl.
*B60R 21/205* (2011.01)
*B60R 21/215* (2011.01)
*B60R 21/217* (2011.01)

(52) U.S. Cl.
CPC ............. *B60R 21/215* (2013.01); *B60R 21/205* (2013.01); *B60R 21/217* (2013.01)

(58) Field of Classification Search
CPC .. B60R 21/215; B60R 21/205; B60R 21/217; B60R 21/2021; B60R 21/2172; B60R 2021/2173
USPC ........................................................ 280/732
See application file for complete search history.

(56) References Cited

U.S. PATENT DOCUMENTS

| 5,482,313 | A | * | 1/1996 | Ikeya | ................. B60R 21/2171 280/728.2 |
| 6,039,342 | A | * | 3/2000 | Sasaki | ................. B60R 21/2171 280/728.3 |
| 2001/0026063 | A1 | | 10/2001 | Yokota | |
| 2001/0040365 | A1 | | 11/2001 | Kitagawa | |
| 2013/0001932 | A1 | * | 1/2013 | Kanno | ................. B29C 65/06 280/728.3 |

FOREIGN PATENT DOCUMENTS

| EP | 1600341 | 11/2005 |
| JP | H07-117607 | 5/1995 |
| JP | H07-117609 | 5/1995 |
| JP | H11-321513 | 11/1999 |
| JP | 2003-306113 | 10/2003 |
| JP | 2005-014799 | 1/2005 |
| JP | 2007-001356 | 1/2007 |
| JP | 2009-202707 | 9/2009 |

OTHER PUBLICATIONS

Extended European Search Report dated May 27, 2015.

* cited by examiner

*Primary Examiner* — Ruth Ilan
(74) *Attorney, Agent, or Firm* — IPUSA, PLLC

(57) ABSTRACT

An airbag apparatus includes an airbag, a gas supplying unit configured to supply gas to the airbag to expand the airbag, a housing configured to support the airbag disposed therein, and a cover configured to cover the airbag, wherein the housing has sidewalls extending toward the cover, hooks protruding from the sidewalls, and at least one guide allocated to one of the sidewalls and situated below the hooks, wherein the cover has mount walls to which the housing is mounted, and wherein the mount walls have engagement holes formed therethrough such that a rotating movement of the cover around a lower tip of one of the mount walls while the lower tip is rested against the guide causes the hooks to be inserted into the engagement holes of the one of the mount walls.

5 Claims, 6 Drawing Sheets

US 9,415,740 B2

AIRBAG APPARATUS

BACKGROUND OF THE INVENTION

1. Field of the Invention

The disclosures herein relate to an airbag apparatus.

2. Description of the Related Art

A certain type of airbag apparatus known in the art includes a housing for accommodating an airbag and a cover for covering the airbag, and has a hook extending from a sidewall of the housing to be engaged in an engagement hole formed in a mount wall projecting from the back face of the cover (see Patent Documents 1 through 6, for example). The airbag apparatus disclosed in these patent documents has a stopper situated below the hook to prevent the movement of the cover or the housing, thereby ensuring that the hook does not disengage from the engagement hole upon load being exerted to the cover or the housing.

In the related-art airbags described above, the positional relationship between the stopper, the hook and the engagement hole should be determined such that the hook does not disengage from the engagement hole upon load being exerted to the cover or the housing. Depending on the positional relationship between the stopper, the hook and the engagement hole, ease of assembly may be degraded when the housing and the cover are assembled during a manufacturing process.

Accordingly, an airbag apparatus may be provided that ensures ease of assembly at the time of assembling a housing for accommodating an airbag and a cover for covering the airbag.

[Patent Document 1] Japanese Patent Application Publication No. 7-117607

[Patent Document 2] Japanese Patent Application Publication No. 7-117609

[Patent Document 3] Japanese Patent Application Publication No. 11-321513

[Patent Document 4] Japanese Patent Application Publication No. 2003-306113

[Patent Document 5] Japanese Patent Application Publication No. 2007-1356

[Patent Document 6] Japanese Patent Application Publication No. 2009-202707

SUMMARY OF THE INVENTION

It is a general object of the present invention to provide an airbag apparatus that substantially obviates one or more problems caused by the limitations and disadvantages of the related art.

According to an embodiment, an airbag apparatus includes an airbag, a gas supplying unit configured to supply gas to the airbag to expand the airbag, a housing configured to support the airbag disposed therein, and a cover configured to cover the airbag, wherein the housing has sidewalls extending toward the cover, hooks protruding from the sidewalls, and at least one guide allocated to one of the sidewalls and situated below the hooks, wherein the cover has mount walls to which the housing is mounted, and wherein the mount walls have engagement holes formed therethrough such that a rotating movement of the cover around a lower tip of one of the mount walls while the lower tip is rested against the guide causes the hooks to be inserted into the engagement holes of the one of the mount walls.

According to an embodiment, an airbag apparatus includes an airbag, a gas supplying unit configured to supply gas to the airbag to expand the airbag, a housing including a bottom wall on which the airbag is disposed, sidewalls extending upward from the bottom wall, hooks protruding sideways from at least two opposing ones of the sidewalls, and at least one guide allocated to one of the two opposing ones of the sidewalls and situated below the hooks, and a cover including a panel and mount walls extending downward from the panel, at least two opposing ones of the mount walls having engagement holes formed therethrough, wherein the engagement holes are arranged such that upon placing the cover over the housing with a lower tip of one of the mount walls being resting against the guide, rotating the cover around the resting lower tip serving as a pivot point causes the hooks protruding from the one of the two opposing ones of the sidewalls to be inserted into the engagement holes of the one of the mount walls.

According to at least one embodiment, ease of assembly for a housing for accommodating an airbag and a cover for covering the airbag is improved.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
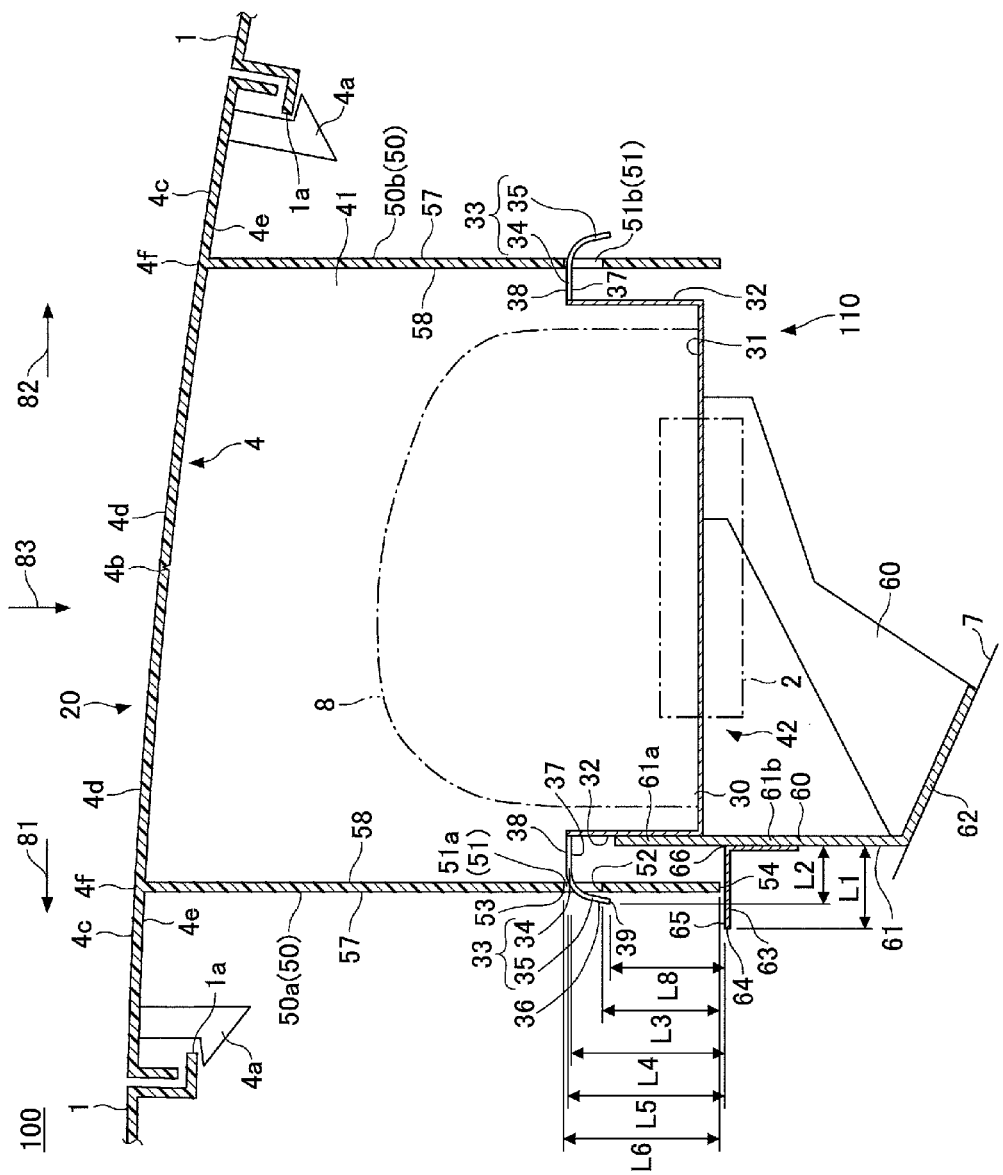
FIG. 1 is a cross-sectional view of an example of the configuration of an airbag apparatus.

FIG. 1 is a schematic cross-sectional view of the configuration of an airbag apparatus according to an embodiment. An airbag apparatus 100 may be installed on the same side of an instrument panel 1 as a vehicle frame 7 where the instrument panel 1 is situated in front of a front passenger seat of the vehicle, for example. An arrow 81 indicates the direction of the rear side of the vehicle (i.e., passenger side), and an arrow 82 indicates the direction of the front side of the vehicle (i.e., windshield side). An arrow 83 indicates the direction of the bottom side of the vehicle, which corresponds to the direction in which a module cover 20 and a retainer 30 are assembled.

The frequency divider circuit 100 includes the module cover 20 and an airbag module 110.

The module cover 20 is an example of a cover that covers an airbag, and serves as a cover panel for covering an airbag 8 that is folded for storage. Like the instrument panel 1, the module cover 20 is a panel that constitutes the front wall of a front passenger seat, which is part of the interior walls defining an occupant space. The instrument panel 1 has an opening 1a having a size that allows the passage of the airbag 8 that is expanded. The opening 1a may have a rectangular shape. The module cover 20 is mounted to the instrument panel 1 through fastening members 4a so as to seal the opening 1a. An example of the fastening members 4a is a clip. However, this is not a limiting example, and the fastening members 4a can be any member.

The module cover 20 may serve as a support member for supporting the airbag module 110 while covering the airbag module 110. The module cover 20 may be formed of resin material such as thermoplastic resin, and is a molded article that is formed as a unitary, continuous structure including an outer panel 4 and mount walls 50. Alternatively, the outer panel 4 and the mount walls 50 may be molded as separate structures, and the module cover 20 may be formed by bonding the outer panel 4 and the mount walls 50 together through welding or press fit.

The module cover 20 has the outer panel 4 that is situated above the airbag 8 in such a manner as to cover the folded airbag 8. The outer panel 4 is fixedly mounted to the instrument panel 1 through the fastening members 4a, for example. An inner face 4e of the outer panel 4 facing toward the airbag 8 may preferably has a plurality of cuts 4b, which facilitate the opening of the outer panel 4 pressed by the expanding airbag 8. The outer panel 4 may be divided by the cuts 4b into two fixed parts 4c and two door parts 4d. The two door parts 4d rotate around hinges 4f upon the cuts 4b being torn apart. The cuts 4b may be formed as a series of line-shaped grooves, for example.

The module cover 20 has the mount walls 50 that define a space 41 for accommodating the retainer 30 together with the airbag 8. The retainer 30 having the airbag 8 disposed thereon is mounted to the mount walls 50, which surround the space 41 like a frame by extending toward the direction of the airbag 8 from the inner face 4e of the outer panel 4. The mount walls 50 constitute side walls that cover part or all of the lateral sides of the retainer 30 and the folded airbag 8. The mount walls 50 extend from the inner face 4e of the outer panel 4 to form the space 41 in which the folded airbag 8 and the retainer 30 are disposed.

The upper side of the space 41 is closed by the outer panel 4. The lower side of the space 41 is open through an opening 42 that is defined by tips 54 of the mount walls 50. The opening 42 serves as an insertion opening through which the folded airbag 8 and the retainer 30 are inserted when assembling the module cover 20 and the retainer 30.

Two of the mount walls 50 that face each other have a plurality of engagement holes 51 arranged in a straight line, respectively (see FIG. 2 through FIG. 7). Namely, a mount wall 50a has a plurality of engagement holes 51a, and a mount wall 50b has a plurality of engagement holes 51b. A plurality of hooks 33 provided on side walls 32 of the retainer 30 are engaged with the respective engagement holes 51, so that the airbag module 110 is mounted to the mount walls 50 as illustrated in FIG. 1.

The engagement holes 51a are formed through the mount wall 50a to connect between an inner wall face 58 and an outer wall face 57 of the mount wall 50a. The engagement holes 51b are formed through the mount wall 50b to connect between an inner wall face 58 and an outer wall face 57 of the mount wall 50b.

The airbag module 110 includes the airbag 8, an inflator 2, and the retainer 30.

The airbag 8 is a cloth configured to be unfolded and expand toward a passenger sitting in the front passenger seat upon opening the outer panel 4 of the module cover 20. The airbag 8 is fixed to the retainer 30 in a folded state. FIG. 1 illustrates a simplified example of the outline of the folded airbag 8 by use of a dashed-dotted line.

The inflator 2 is an example of a gas supplying unit that supplies gas to the folded airbag 8 to unfold and expand the airbag 8. The gas supplying unit illustrated as the inflator 2 is fixedly mounted to a bottom wall 31 of the retainer 30, and injects gas into the folded airbag 8 to unfold and expand the airbag 8. The inflator 2 may be fixedly mounted to an inner wall face of the bottom wall 31 facing toward the module cover 20, or may be fixedly mounted to an outer wall face of the bottom wall 31 facing opposite from the module cover 20. FIG. 1 illustrates a simplified example of the outline of the inflator 2 by use of a dashed-dotted line.

The retainer 30 is an example of a housing in which the folded airbag 8 is disposed, and serves to support at the bottom wall 31 thereof the folded airbag 8 together with the inflator 2. The retainer 30 has a box shape that has an opening at the top.

The retainer 30 has the side walls 32 extending from the bottom wall 31 toward the direction of the outer panel 4 of the module cover 20. The side walls 32 define the space in which the inflator 2 and the folded airbag 8 are accommodated. The side walls 32 are configured to surround part or all of the side faces of the folded airbag 8.

The retainer 30 has the hooks 33 projecting sideways (i.e., projecting outwardly) from the outer faces of the side walls 32. The hooks 33 arranged in a straight line are provided on each of the two side walls 32 that face each other.

Each of the hooks 33 may include an extending part 34 extending outwardly from the upper tip of the outer wall face of the side wall 32, and may include a bent part 35 bent downwardly at an oblique angle relative to the direction in which the hook 33 projects (i.e., the direction in which the extending part 34 extends). The bent part 35 continues from the end of the extending part 34, and is curved to extend toward a guide face 65 of a guide 63 at an oblique angle relative to the extending part 34.

The extending part 34 has a mounting foot 60 serving as a fixing member that is fixedly mounted to the vehicle frame 7 through a mounting plate 62. The mounting foot 60 may be fixed through welding to the bottom wall 31 and the side wall 32 of the retainer 30. The mounting foot 60 includes the mounting plate 62 fixedly mounted to the vehicle frame 7 and a mounting plate 61 that is fixedly mounted to the outer wall face of the side wall 32 situated toward the passenger side.

The mounting plate 61 projects from the bottom wall 31 in the direction opposite to the direction in which the side walls 32 of the retainer 30 extend from the bottom wall 31. The mounting plate 61 and the side wall 32 to which an upper part 61a of the mounting plate 61 is mounted are arranged such that a lower part 61b of the mounting plate 61 is substantially parallel to the side wall 32. The lower part 61b is a remaining lower part of the mounting plate 61 other than the upper part 61a, and is defined as a part extending relative to the bottom wall 31.

In FIG. 1, the upper part 61a of the mounting plate 61 is bonded through welding or the like to the outer wall face of the side wall 32 situated toward the passenger side. The upper part 61a of the mounting plate 61 may be bonded through welding or the like to the outer face of the bottom wall 31. In FIG. 1, the retainer 30 and the mount walls 50 are assembled by inserting the hooks 33 into the engagement holes 51, so that the upper part 61a of the mounting plate 61 is situated between the inner wall face 58 of the mount wall 50 and the outer wall face of the side wall 32 situated toward the passenger side.

The retainer 30 has the guide 63 situated below the hooks 33. One or more guides 63 may be provided. When the retainer 30 and the mount walls 50 are assembled by inserting the hooks 33 into the engagement holes 51, the guide 63 is situated lower than a bottom tip 54 of the mount wall 50. The guide 63 is a bracket member that is fastened through welding or the like to an outer mounting face of the mounting plate 61. The guide 63 may be fixedly mounted to the lower part 61b of the mounting plate 61, or may be fixedly mounted to the upper part 61a of the mounting plate 61.

The guide 63 may be a member projecting sideways (i.e., projecting outwardly) from the outer mounting face of the mounting plate 61 (i.e., outwardly projecting relative to the side wall 32) and having a tip 64. The upper face of the guide 63 constitutes the guide face 65 for guiding the bottom tip 54 of the mount wall 50. A proximal end 66 of the guide 63 is the intersection of the mounting plate 61 and the guide face 65. The guide 63 has a L-letter shape, and is disposed such that the guide face 65 faces the bottom tip 54.

FIG. 2 through FIG. 5 illustrate the process steps through which the module cover 20 is assembled to the retainer 30 of the airbag module 110.

Figure 2:
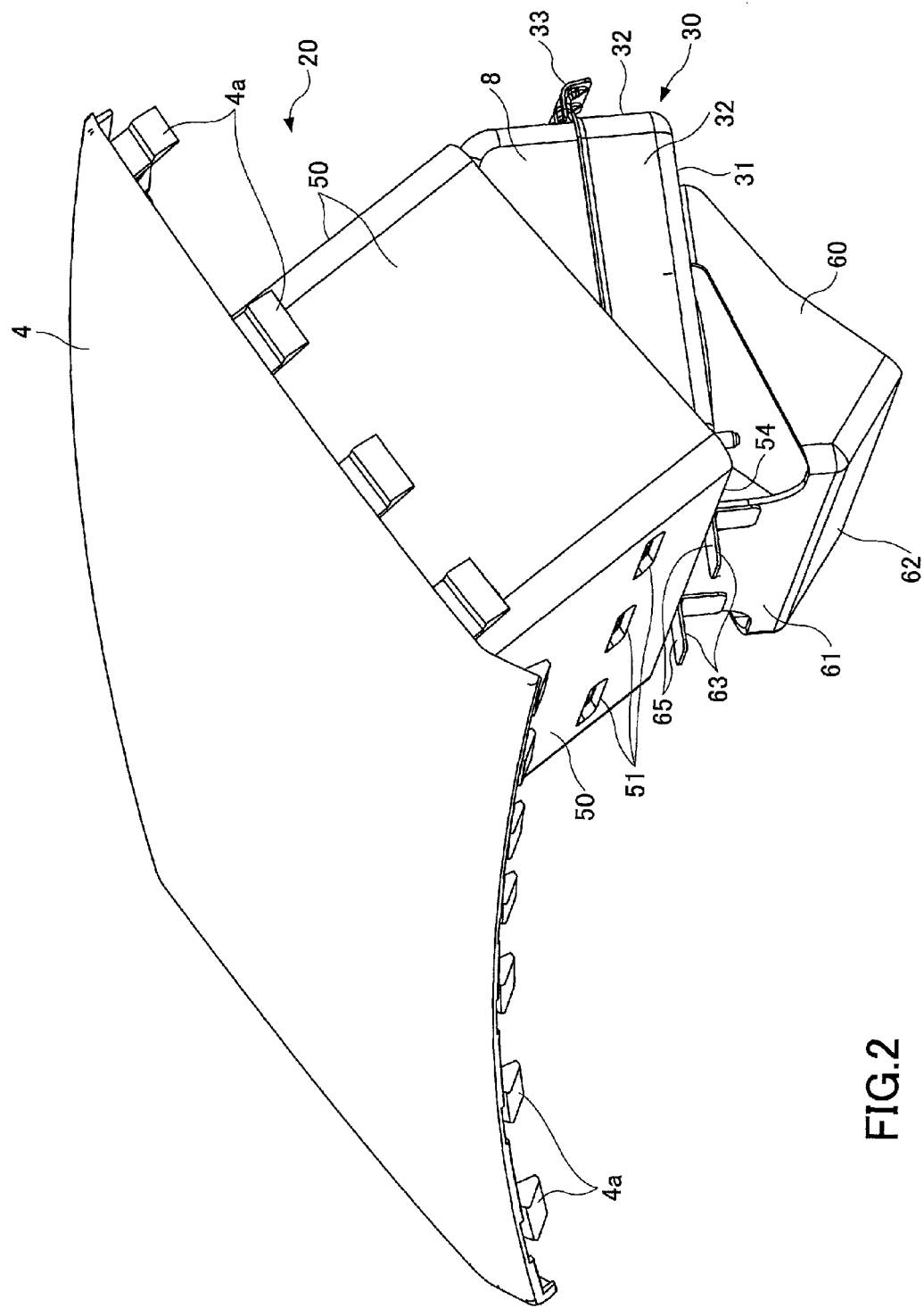
FIG. 2 is a drawing illustrating an example of the method of assembling a housing and a cover.

FIG. 2 is a drawing illustrating the state in which the bottom tip 54 of the mount wall 50 situated toward the passenger side is set against the guide face 65 of the guide 63. An assembly worker or assembly apparatus securely mounts the retainer 30 to a workbench such that the guide 63 is situated to face the worker or apparatus. With the retainer 30 mounted on the workbench, the worker or apparatus sets against the guide face 65 the bottom tip 54 of the mount wall 50 situated toward the worker or apparatus.

Figure 3:
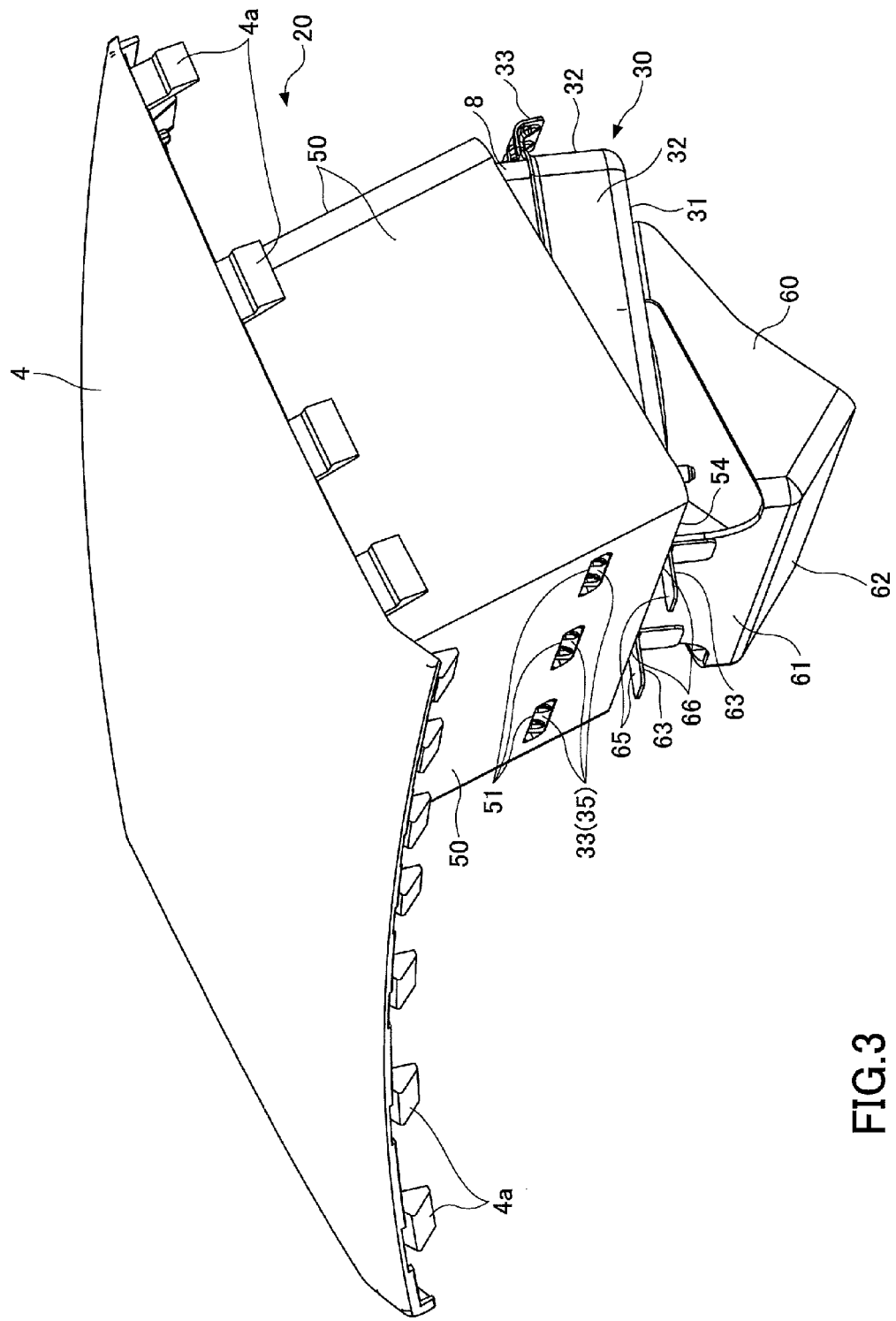
FIG. 3 is a drawing illustrating an example of the method of assembling a housing and a cover.

FIG. 3 is a drawing illustrating the state in which, with the bottom tip 54 of the mount wall 50 situated toward the passenger side being resting against the guide face 65, the module cover 20 is rotated such that the airbag 8 and the retainer 30 are stored in the space surrounded by the mount walls 50. The module cover 20 is rotated while the position of the bottom tip 54 is fixed by the guide face 65 and the outer mounting face of the mounting plate 61. FIG. 3 illustrates the state in which the bent parts 35 of the hooks 33 are inserted into, and start to appear through, the engagement holes 51 formed through the mount wall 50 situated toward the passenger side.

The assembly worker or assembly apparatus rotates the module cover 20 by pushing the module cover 20 away from the worker or apparatus while the bottom tip 54 is resting against the guide face 65, for example. In doing so, the bottom tip 54 is urged against the proximal end 66 of the guide 63 (i.e., the intersection of the guide face 65 and the mounting plate 61) to utilize the proximal end 66 as a pivot point for the rotation of the module cover 20, thereby ensuring stable rotation of the module cover 20.

Figure 4:
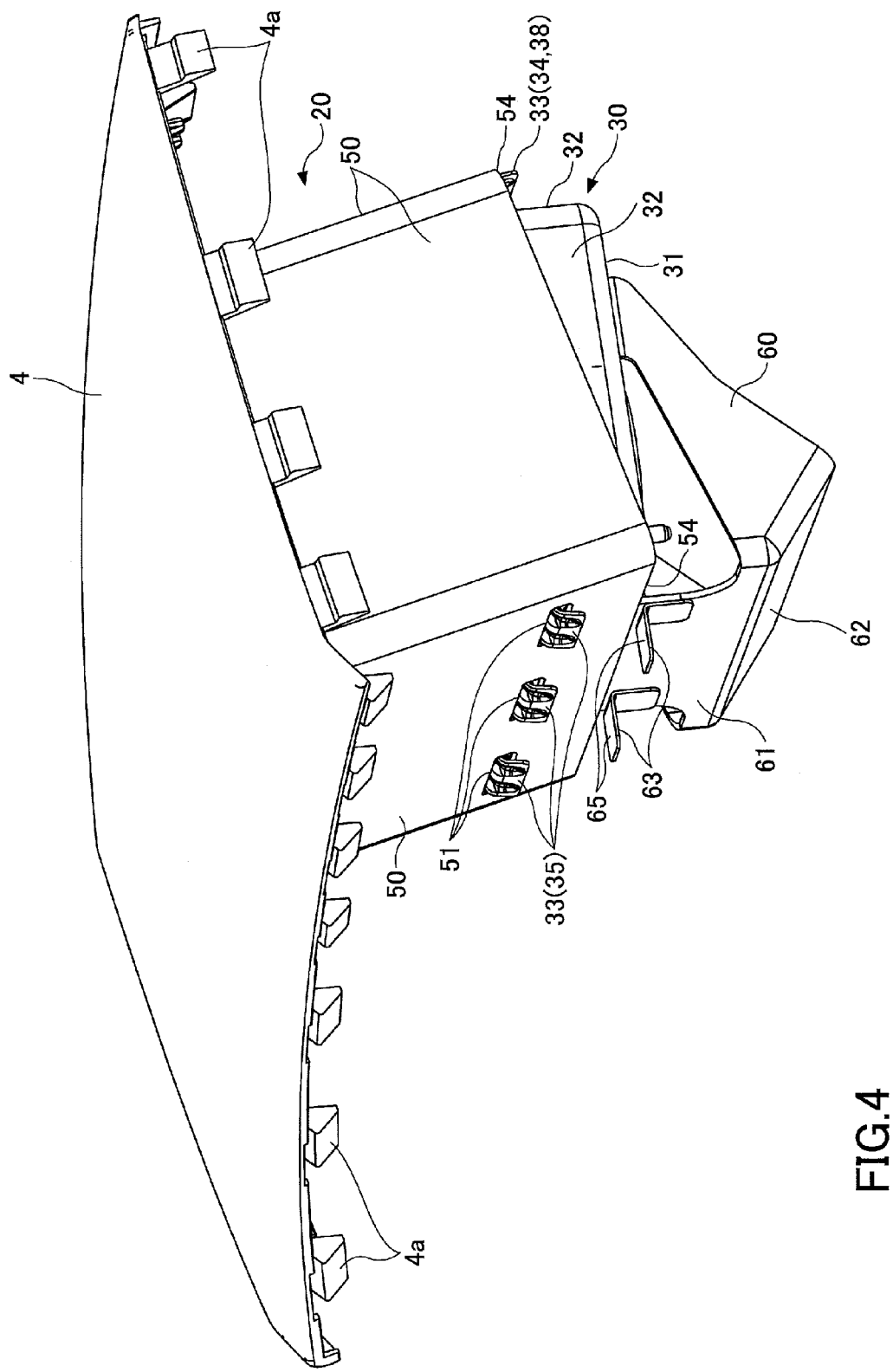
FIG. 4 is a drawing illustrating an example of the method of assembling a housing and a cover.

FIG. 4 is a drawing illustrating the state in which the bent parts 35 of the hooks 33 are fully inserted into the engagement holes 51 formed through the mount wall 50 situated toward the passenger side. As the module cover 20 continues to rotate around the bottom tip 54 supported by the guide face 65, the bottom tip 54 of the mount wall 50 situated toward the front side of the vehicle comes in contact with an upper face 38 (see FIG. 1) of the extending part 34 of the hooks 33 situated toward the front side of the vehicle.

As the force continues to be applied to rotate the module cover 20, the module cover 20 starts rotating around the contact point between the bottom tip 54 of the mount wall 50 situated toward the front side of the vehicle and the upper faces 38 of the extending parts 34 of the hooks 33 situated toward the front side of the vehicle. As a result, as illustrated in FIG. 4, the bottom tip 54 of the mount wall 50 situated toward the passenger side is separated from the guide face 65 of the guide 63, so that lower ends 52 (see FIG. 1) of the engagement holes 51 formed through the mount wall 50 situated toward the passenger side come in contact with lower faces 37 of the extending parts 34 of the hooks 33 situated toward the passenger side.

Figure 5:
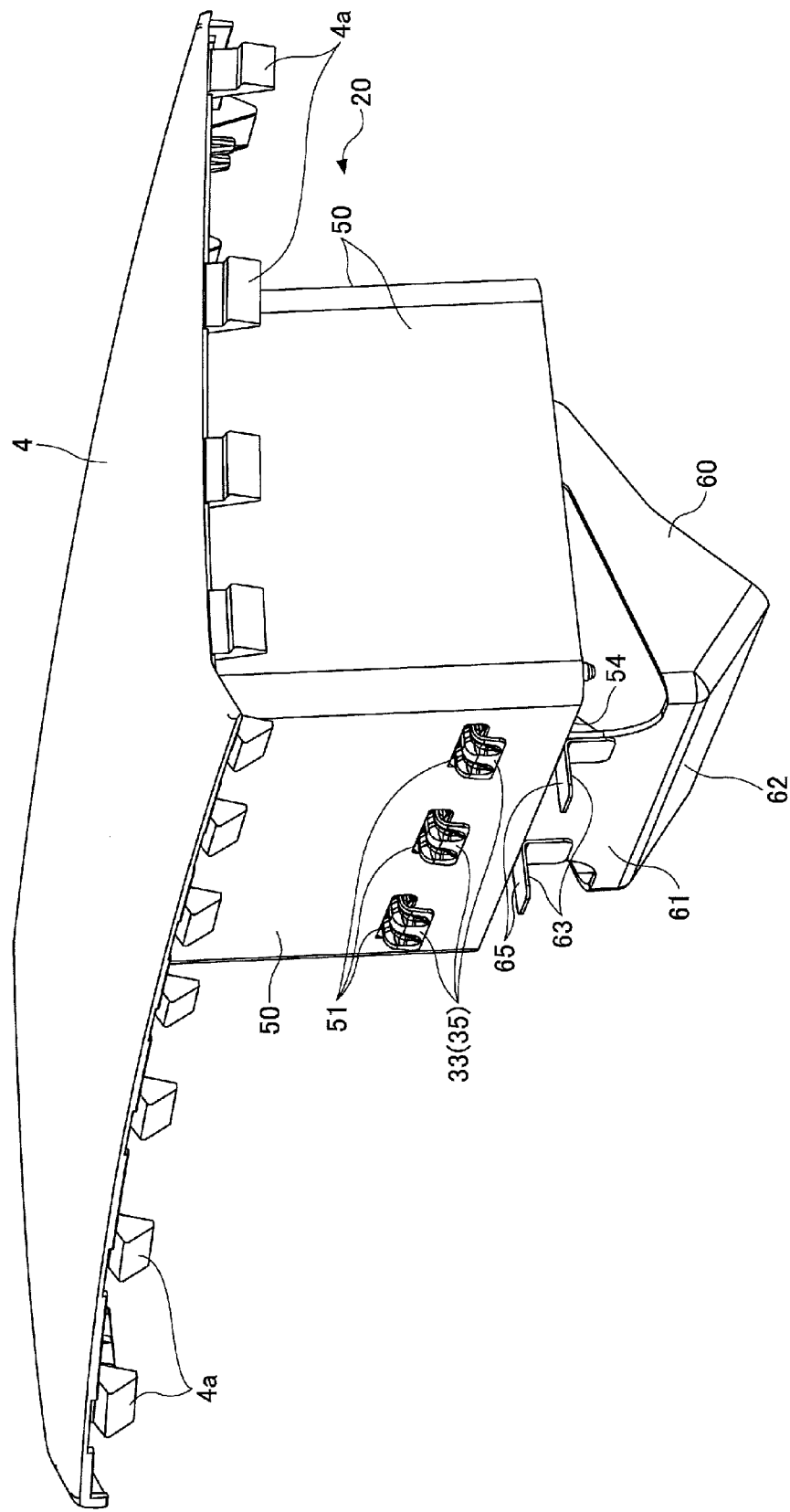
FIG. 5 is a drawing illustrating an example of the method of assembling a housing and a cover.

As the force continues to be applied to rotate the module cover 20, the module cover 20 starts rotating around the contact point between the lower ends 52 of the engagement holes 51 formed through the mount wall 50 situated toward the passenger side and the lower faces 37 of the extending parts 34 of the hooks 33 situated toward the passenger side. With this movement, the inner face of the mount wall 50 situated toward the front side of the vehicle is pressed against the bent parts 35 of the hooks 33 situated toward the front side of the vehicle, so that the mount wall 50 situated toward the front side of the vehicle is deformed to bulge toward the front side of the vehicle. As the mount wall 50 situated toward the front side of the vehicle is deformed to bulge toward the front side of the vehicle, the hooks 33 situated toward the front side of the vehicle are inserted into and engage with the engagement holes 51 formed through the mount wall 50 situated toward the front side of the vehicle. With this, the assembling of the module cover 20 and the retainer 30 is completed as illustrated in FIG. 5.

It may be noted that the module cover 20 may be assembled with the retainer 30 while the bottom tip 54 situated toward the passenger side is rested against the guide face 65 without being separated from the guide face 65.

As described above, the mount walls 50, one situated toward to the passenger side and the other situated toward the front side of the vehicle, have the engagement holes 51 into which the hooks 33 on the passenger side and on the front side of the vehicle are inserted as the module cover 20 is rotated while the bottom tip 54 of the mount wall 50 situated toward the passenger side is rested against the tip 64. This arrangement improves ease of assembly, thereby ensuring that the module cover 20 and the retainer 30 are easily assembled. Further, since the hooks 33 are inserted into and engaged with the engagement holes 51, the hooks 33 do not easily disengage from the engagement holes 51 once the module cover 20 and the retainer 30 are assembled.

The hooks 33 are situated on the trajectory of the rotating engagement holes 51 observed when the module cover 20 rotates while the bottom tip 54 is rested on the guide 63, so that the hooks 33 can pass through the engagement holes 51 as the engagement holes 51 move along such a trajectory.

In FIG. 1, the guide 63 projects in the same direction in which the hooks 33 project, and preferably projects as far as or longer than the hooks 33 project. For example, the hooks 33 and the guide 63 are configured and arranged such that L1 is greater than L2 as measured along the normal to the outer face of the mounting plate 61. L1 and L2 each represent a length as measure along the normal. L1 represents the distance between the outer mounting face of the mounting plate 61 and the tip 64 of the guide 63. L2 represents the distance between the outer mounting face of the mounting plate 61 and a distal end 36 of the hooks 33.

In this manner, the guide 63 projects as far as or longer than the hooks 33 in the direction of the normal, so that the bottom tip 54 of the mount wall 50 can easily be set against the guide face 65 when the module cover 20 and the retainer 30 are to be assembled. Even if the bottom tip 54 is initially pressed against the guide face 65 at a point closer to the tip 64 thereof, the guide 63 may guide the sliding movement of the bottom tip 54 on the guide face 65 toward the proximal end 66 from the tip 64. As a result, the module cover 20 is stably rotated around the proximal end 66 serving as a pivot point, thereby improving the ease of assembly of the module cover 20 and the retainer 30.

Further, the hooks 33, the guide 63 and the engagement holes 51 are preferably formed and arranged such that L3 is shorter than L4 in a plan view as viewed in (i.e., plan view perpendicular to) the direction parallel to the direction in which the extending part 34 extends. L3 and L4 represent lengths in the plan view as viewed in the direction parallel to the direction in which the extending part 34 extends. L3 is the distance from the bottom tip 54 of the mount wall 50 to the lower ends 52 of the engagement holes 51. L4 is the distance from the guide face 65 of the guide 63 to the lower face 37 of the extending part 34.

L6 may be longer than or equal to L5, or may be shorter than L5. L5 and L6 represent lengths in the plan view as viewed in the direction parallel to the direction in which the extending part 34 extends. L6 is the distance from the bottom tip 54 of the mount wall 50 to the upper ends 53 of the engagement holes 51. L5 is the distance from the guide face 65 of the guide 63 to the upper face 38 of the extending part 34.

Further, the hooks 33, the guide 63 and the engagement holes 51 are preferably formed and arranged such that L3 is longer than or equal to L8 in a plan view as viewed in the direction parallel to the direction in which the extending part 34 extends. L3 and L8 represent lengths in the plan view as viewed in the direction parallel to the direction in which the extending part 34 extends. L3 is the distance from the bottom tip 54 of the mount wall 50 to the lower ends 52 of the engagement holes 51. L8 is the distance from the guide face 65 of the guide 63 to the lower tip 39 of the bent part 35.

The relationship between L3 and L8 as described above ensures that the hooks 33 upon being inserted into the engagement holes 51 are not easily disengaged from the engagement holes 51.

Figure 6:
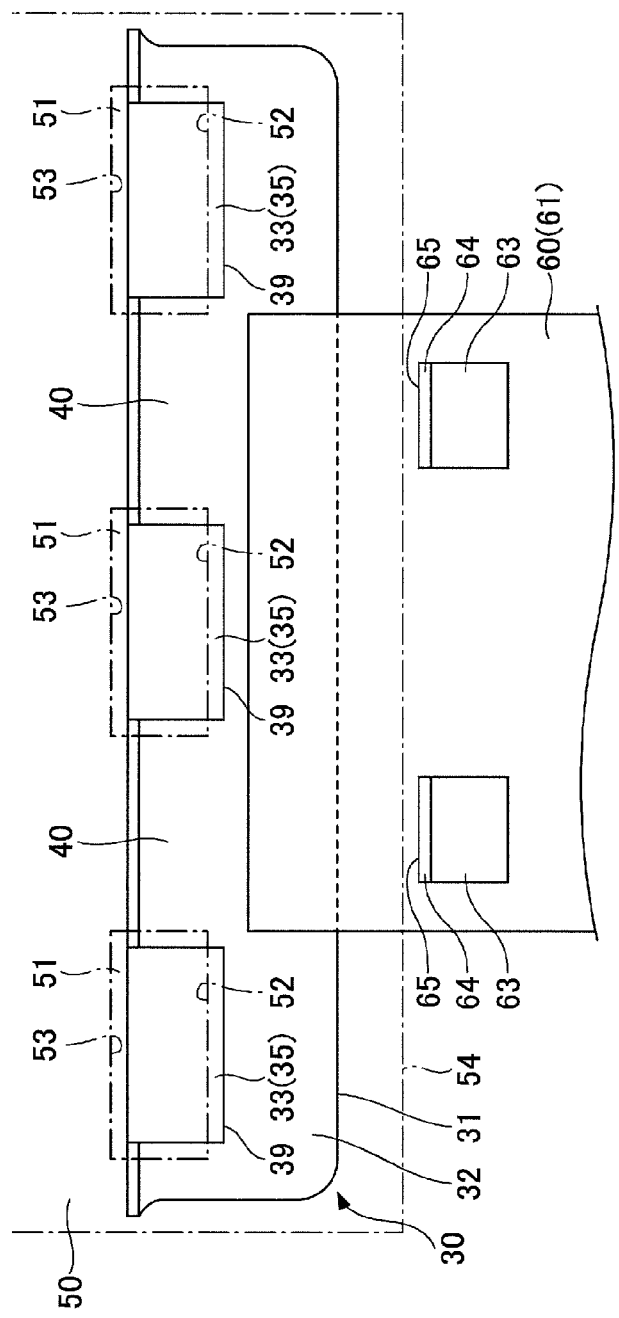
FIG. 6 is a drawing illustrating an example of the positional relationship between guides, hooks and engagement holes.

FIG. 6 is a drawing illustrating an example of the positional relationship between the guide 63, the hooks 33 and the engagement holes 51. FIG. 6 illustrates a plan view as viewed in the direction parallel to the direction in which the extending parts 34 of the hooks 33 extend and as viewed from the side where the guide 63 is visible. The mount wall 50 is illustrated by use of a dashed-dotted line for the purpose of providing a clearer view of positional relationships.

As illustrated in FIG. 6, the guides 63 are situated directly below the gaps 40 between immediately adjacent hooks 33. The provision of the guides 63 in such a manner ensures that the hooks 33 do not interfere when the bottom tip 54 of the mount wall 50 is attempted to be set against the guide faces 65 of the guides 63, thereby allowing the bottom tip 54 to be easily set against the guide faces 65. This improves the ease of assembly of the module cover 20 and the retainer 30.

Although the airbag apparatus has been described by referring to embodiments, the present invention is not limited to these embodiments. Various modifications and improvements such as combining an embodiment partially or entirely with one or more other embodiments or replacing part of an embodiment with part of another embodiment may be made without departing from the scope of the present invention.

For example, the guide 63 may be provided with a stopper function to regulate the movement of the module cover 20 and the retainer 30 in order to prevent the hooks 33 from disengaging from the engagement holes 51 when load is imposed on the module cover 20 and/or on the retainer 30. The load may be applied in the direction indicated by the arrow 83 in FIG. 1 or in the opposite direction, for example.

Further, the guide 63 may not be a separate part discontinuous with the mounting foot 60, and may be a part formed integrally with the mounting foot 60 as a unitary, continuous article. For example, the guide 63 may be formed by bending some portion of the mounting plate 61.

Moreover, the guide 63 may not be fastened to the mounting plate 61, and may be directly fastened to the retainer 30. For example, the guide 63 may be mounted to the side walls 32 or to the bottom wall 31 of the retainer 30.

The module cover 20 may be assembled with the retainer 30 that is fixedly placed, or the retainer 30 may be assembled with the module cover 20 that is fixedly placed.

Figure 7:
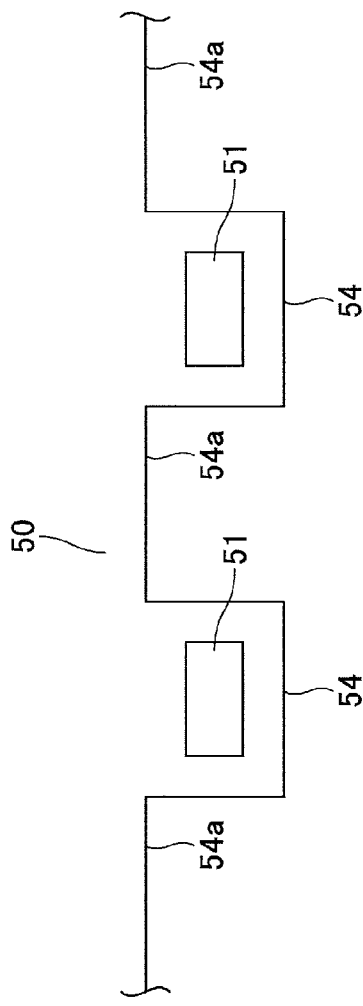
FIG. 7 is a drawing illustrating an example of the shape of a lower tip of a mounting wall.

As illustrated in FIG. 7, for example, the bottom tip 54 of the mount wall 50 may have recesses 54a. The engagement holes 51 may be formed in the areas situated between the immediately adjacent recesses 54a.

The present application is based on and claims the benefit of priority of Japanese priority application No. 2013-262849 filed on Dec. 19, 2013, with the Japanese Patent Office, the entire contents of which are hereby incorporated by reference.

What is claimed is:

1. An airbag apparatus, comprising:
    an airbag;
    a gas supplying unit configured to supply gas to the airbag to expand the airbag;
    a housing configured to support the airbag disposed therein; and
    a cover configured to cover the airbag,
    wherein the housing has sidewalls extending toward the cover, hooks protruding from the sidewalls, and at least one guide allocated to one of the sidewalls and situated below the hooks,
    wherein the cover has mount walls to which the housing is mounted,
    wherein the mount walls have engagement holes formed therethrough such that a rotating movement of the cover around a lower tip of one of the mount walls while the lower tip is rested against the guide causes the hooks to be inserted into the engagement holes of the one of the mount walls, and
    wherein the lower tip of the one of the mount walls has a position thereof fixed, as a pivot point for the rotating movement of the cover, by the guide and a member to which the guide is attached.

2. The airbag apparatus as claimed in claim 1, wherein the guide projects in a direction in which the hooks project, and projects as far as or longer than the hooks project.

3. The airbag apparatus as claimed in claim 1, wherein one of the hooks protruding from the one of the sidewalls has an extending part extending from the one of the sidewalls, and wherein in a plan view as viewed in a direction parallel to a direction in which the extending part extends, a distance from the lower tip of the one of the mount walls to a lower end of a corresponding one of the engagement holes is shorter than a distance from the guide to a lower face of the extending part.

4. The airbag apparatus as claimed in claim 1, wherein one of the hooks protruding from the one of the sidewalls includes an extending part extending from the one of the sidewalls, and further includes a bent part situated at an angle relative to a direction in which the extending part extends, and wherein in a plan view as viewed in a direction parallel to the direction in which the extending part extends, a distance from the lower tip of the one of the mount walls to a lower end of a corresponding one of the engagement holes is longer than or equal to a distance from the guide to a lower tip of the bent part.

5. An airbag apparatus, comprising:

an airbag;

a gas supplying unit configured to supply gas to the airbag to expand the airbag;

a housing including a bottom wall on which the airbag is disposed, sidewalls extending upward from the bottom wall, hooks protruding sideways from at least two opposing ones of the sidewalls, and at least one guide allocated to one of the two opposing ones of the sidewalls and situated below the hooks; and a cover including a panel and mount walls extending downward from the panel, at least two opposing ones of the mount walls having engagement holes formed therethrough, wherein the engagement holes are arranged such that upon placing the cover over the housing with a lower tip of one of the mount walls being resting against the guide, rotating the cover around the resting lower tip serving as a pivot point causes the hooks protruding from the one of the two opposing ones of the sidewalls to be inserted into the engagement holes of the one of the mount walls, and wherein the lower tip of the one of the mount walls has a position thereof fixed, as the pivot point for the rotating movement of the cover, by the guide and a member to which the guide is attached.

* * * * *